March 26, 1963 W. L. BENNINGHOFF 3,082,446
TAPER THREAD CUTTING DIE HEAD WITH RADIALLY REMOVABLE
WEDGE ELEMENTS FOR CONTROLLING THE CHASERS
Filed Dec. 22, 1959 3 Sheets-Sheet 1

INVENTOR.
William L. Benninghoff,
BY
John H. Leonard,
his ATTORNEY.

INVENTOR.
William L. Benninghoff,
BY
John H. Leonard,
his ATTORNEY.

United States Patent Office 3,082,446
Patented Mar. 26, 1963

3,082,446
TAPER THREAD CUTTING DIE HEAD WITH RADIALLY REMOVABLE WEDGE ELEMENTS FOR CONTROLLING THE CHASERS
William L. Benninghoff, Waite Hill, Willoughby, Ohio
Filed Dec. 22, 1959, Ser. No. 861,337
2 Claims. (Cl. 10—120.5)

This invention relates to a die head for rotary spindle thread cutting machines, and particularly to a die head employing high speed carbide thread cutting chasers which advance and recede for cutting tapered threads.

Heretofore in the cutting of tapered threads the conventional practice has been to provide a rotary head having a plurality of circumferentially spaced, radial slots, each opening through the periphery and through the forward or cutting face of the head, with chaser supporting blocks mounted in the slots for radial movement toward and away from the axis of the head.

A typical early type of head is disclosed in my United States Letters Patent No. 2,054,028, issued September 8, 1936. As therein more fully disclosed, the head comprises a main body having radial slots in which the chaser blocks were mounted for advancing and receding. The blocks are caused to advance and recede by suitable wedge elements having wedge surfaces engageable with complementary wedge surfaces on the blocks.

The wedge elements are arranged to move endwise or parallel to the axis of the head for effecting the advance and recession of the blocks. For this purpose they are mounted on an annular carrier or ring 33 which is fitted onto suitable guide surfaces on the periphery of the head in coaxial relation to the head for sliding endwise axially of the head.

For precision work, it is necessary that such rings be very precisely fitted to the heads and the wedges very precisely fitted to the rings. Furthermore, the radial distances from the head axis to various parts must be extremely precise. Ordinarily lubricants are pumped through suitable ducts in the head and discharged onto the workpiece at the point of application of the chasers thereto.

This die head operates very satisfactorily for tapered threading of many types of metals with many types of chasers. However, with the introduction of the higher alloys and carbide chasers for extremely high speed threading, the type of prior structure such as shown in the above identified patent is unsatisfactory. It is unsatisfactory because the threading is done at such high speed that a great amount of heat is developed and conducted into the die head.

This heat is sufficient to expand the head radially a significant amount. However, the wedge carrying outer ring which is in sliding engagement with the periphery of the head is not subject to direct metal to metal conduction of heat from the head. The ring is well exposed to the air by which it is cooled readily during rotation. Consequently it does not heat to as great a degree as the head and hence does not expand appreciably.

As a result, at high speeds, the head expands to such a degree as to bind tightly in the wedge operating ring and has to be cooled down. The die head is thereby rendered inoperative for periods of time amounting to several hours each.

Due to the fact that the wedges for operating the blocks are carried by the ring, the wedges do not heat to as high a degree as the head. As the head and chaser blocks heat and expand, the wedges are retained in fixed position radially by the ring so long as the ring is not shifted axially. Hence the inner ends of the chaser blocks are moved by expansion in a direction away from the wedges toward the head axis a distance determined by the amount of expansion of the head and blocks. This changes the setting of the machine.

Due to these difficulties attempts were later made to form the head in one piece without a ring, mount the wedges in the head for sliding endwise in the head, and slide them by some means connected to them at the rear face of the head.

However, along with a demand for increased speed of cutting, the precision required in the threads has greatly increased. Also, at the higher speeds, the lubricants used themselves become heated and consequently heat the heads to higher temperatures. As an example of the precision demanded, distances must be uniform from the center line of the head to the various control surfaces within .0005 of an inch. By using a one-piece head, all of the slots for the wedges and for the chaser blocks must be located and milled or otherwise cut from the front end of the head, instead of radially. This cutting requires many types of specialized tools and extremely precise work so that the heads became unduly expensive to manufacture. Such heads permit little adjustment for wear and the like.

Considerable difficulties also are encountered in assembling such a one-piece head. Assembly requires the insertion of the blocks radially, pre-adjustment of the wedges on the slideable ring, and then the installation and adjustment of the ring and wedges axially of the head. If any one part is not adjusted in proper relation to the others, disassembly, re-adjustment and re-assembly are necessary. Quite often it is necessary to assemble and dis-assemble the head several times to obtain the proper relations of the parts to each other.

In order to overcome these various difficulties the head of the present invention was developed.

The principal object of the present invention is to provide a die head employing advancing and receding chaser blocks for the taper cutting of screw threads which head can be readily manufactured; of which the parts are interfitted precisely with close tolerances yet are free from binding and the like due to expansion and contraction of the head; which holds its setting accurately throughout the operating range of temperatures to which it is normally subjected; and of which the various parts can readily be assembled and disassembled, for repair, cleaning and servicing.

A more specific object is to overcome the difficulties described in connection with the prior art by providing a head having a one-piece body with slots for the wedges and chaser blocks so arranged that the slots can be machined radially of the head and the chaser blocks and wedges can be assembled radially of the head.

Other objects and advantages of the present invention will become apparent from the following description, wherein reference is made to the drawings, in which.

Figure 1:
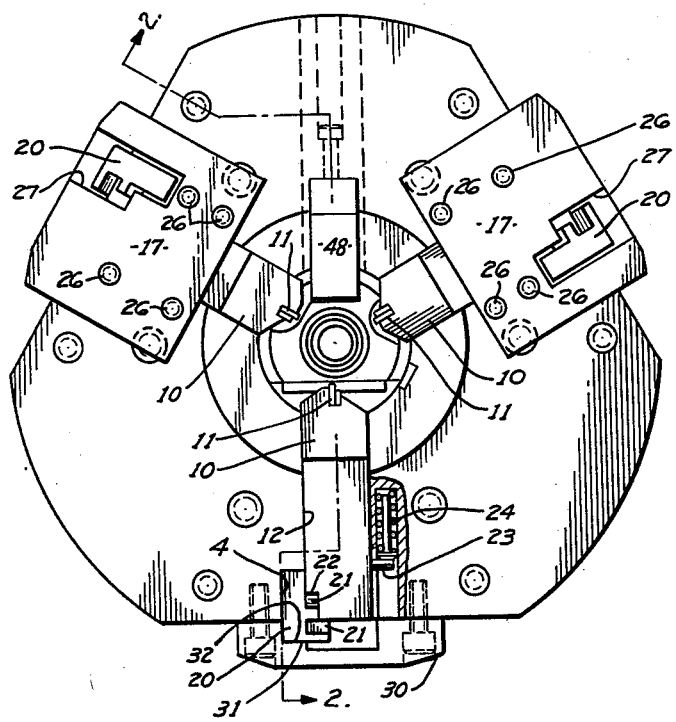
FIG. 1 is a front elevation of a die head of the character described, illustrating the present invention, one of the front plates being omitted for clearness in illustration.
Figure 2:
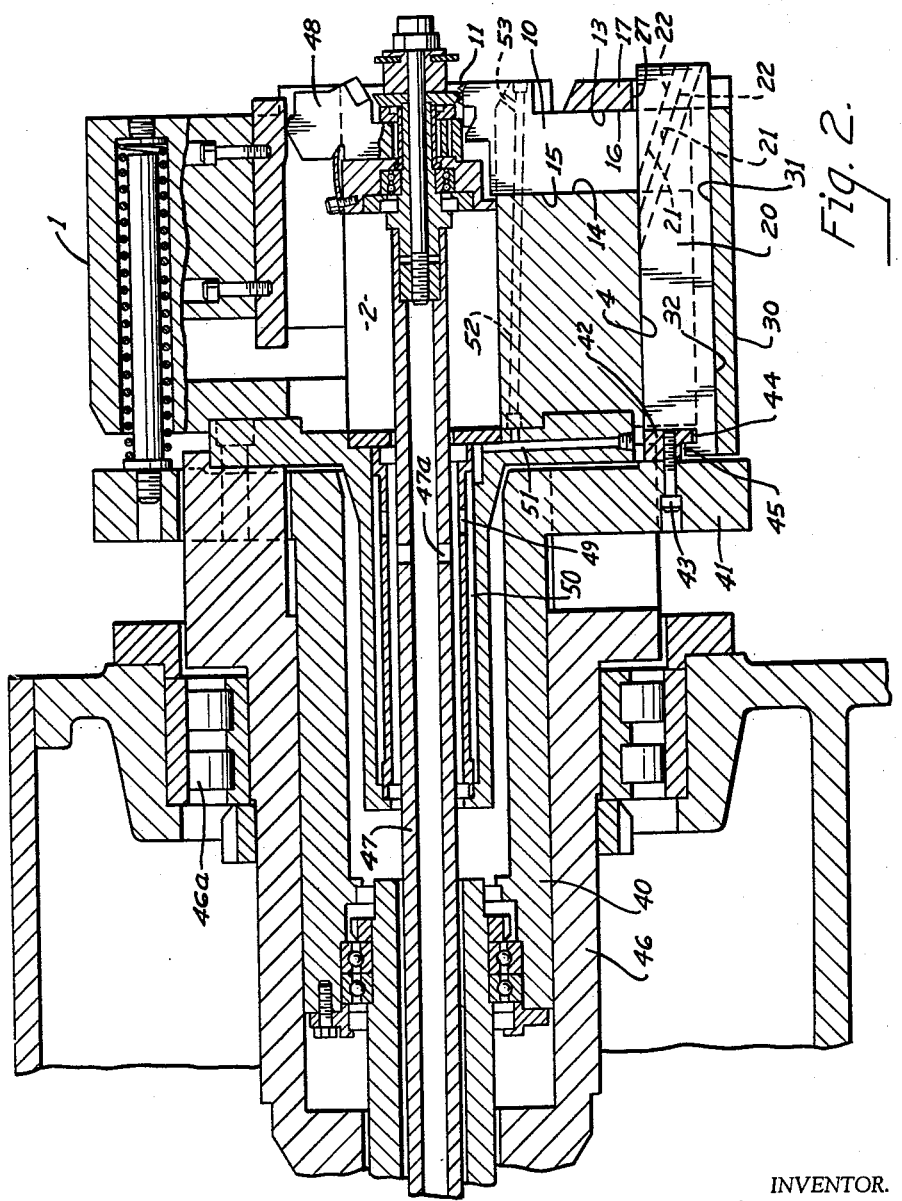
FIG. 2 is a fragmentary longitudinal sectional view of the head illustrated in FIG. 1, and is taken on line 2—2 thereof.
Figure 3:
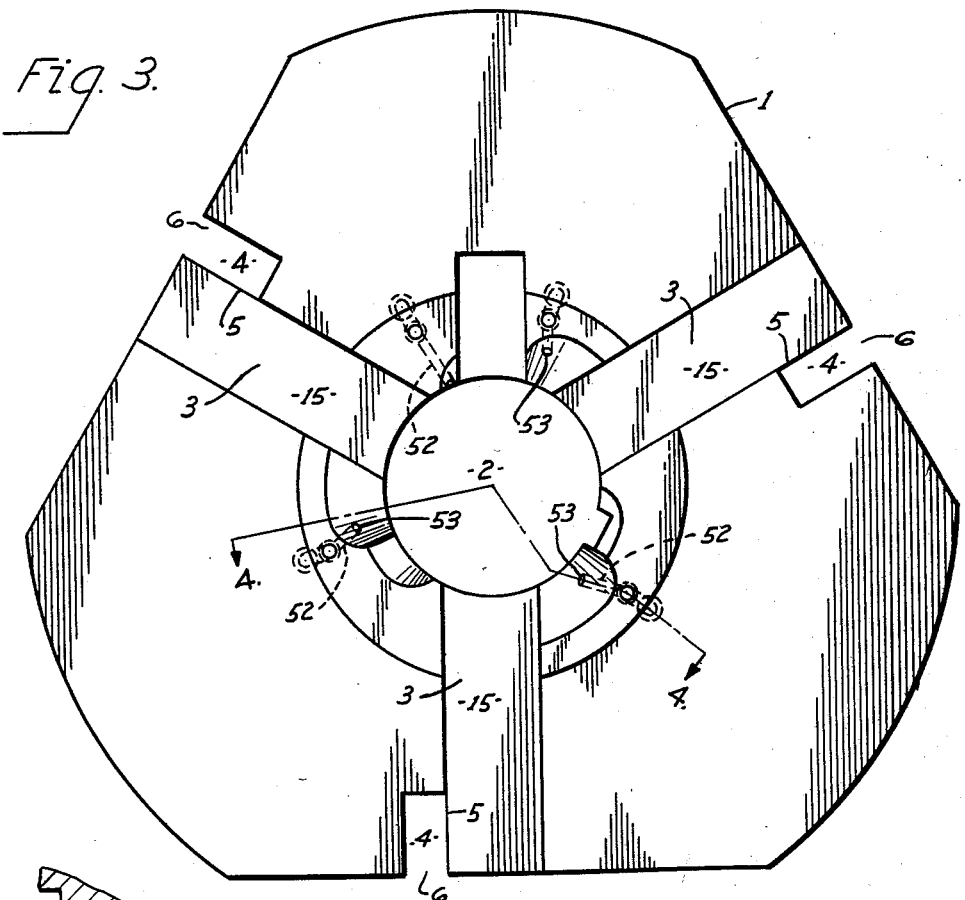
FIG. 3 is a front elevation of the body of the head with the operating parts removed.
Figure 4:
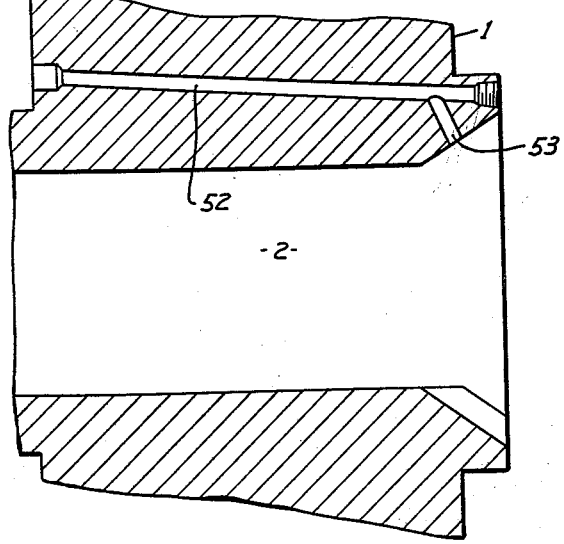
FIG. 4 is a fragmentary sectional view taken on the line 4—4 in FIG. 3.

Referring to the drawings, the head comprises a solid body 1 having a central axial passage 2 into which a length of pipe can extend during threading. Leading from the passage 2 are circumferentially spaced radial slots 3, each of which extends from the passage 2 to the outer periphery of the body 1. The radial slots 3 open at their inner ends into the passage 2 and open at their outer ends through the peripheral wall of the body. In the form illustrated three chasers are employed and therefore three slots are provided. The slots 3 are adapted to receive chaser blocks later to be described. At the outer sides of the slots 3 are suitable notches 4, arranged one notch 4 to each slot 3. Each notch 4 is open at one side into its associated slot 3, as indicated at 5, and also is open for access radially at the outer periphery of the head 1, as indicated at 6. Since the slots and chaser blocks and their operating mechanisms are the same in form and function, only one will be referred to in detail. As best illustrated in FIGS. 1 and 2 each chaser block 10 is mounted in its slot 3 for reciprocation radially of the head 1. The chaser block is of sufficient length so that it can extend into the central passage 2 for disposing its associated chaser 11 in cutting relation to the pipe to be cut. Each chaser block 10 is held by its slot in fixed circumferential position relative to the body 1 and has lateral sliding surfaces 12 cooperable with complementary sliding surfaces in the walls of the slot. Each block also has a forward slide surface 13 and a rearward slide surface 14, the surface 14 being juxtaposed against a cooperating slide surface 15 of the body. The forward slide surface 13 of each block is arranged for engagement with the inner slide surface 16 of a front plate 17 secured on the forward face of the body 1.

Mounted in the notches 4 for reciprocation endwise of the head 1 are wedge elements 20. Each wedge element has wedge surfaces 21 cooperable with wedge surfaces 22 of the asceociated block 10. These surfaces are so arranged, as best illustrated in FIG. 2, so that upon movement of the wedge element 20 forwardly relative to the head 1 the block 10 is advanced toward the axis of the head and upon movement of the wedge element 20 toward the rear relative to the head 1, the block 10 is receded or retracted. The wedge surfaces of each block 10 are preferably provided by means of a groove extending endwise of, but on a bias to, the axis of the head and open at one side of the block whereby, as best illustrated in FIG. 2, each wedge element 20 and its associated block can be assembled and then both together installed in the associated slot 3 and notch 4, radially of the head. Each block is provided with a suitable return pin 23 engaged by a spring 24 mounted in the head 1 and extending parallel to the path of movement of the block.

The slots 3 extend to the forward face of the body 1 and the blocks 10 are disposed preferably with their forward faces 14 flush with the forward face of the body. Front plates 17 are secured detachably in fixed position to the front of the body by suitable means such as bolts 26 so that the plates can be drawn firmly against the forward face of the body with their guide surface 16 in sliding cooperation with the forward guide faces 3 of the chaser blocks 10, respectively. Thus the blocks are mounted for travel in a fixed radial paths. The notches 4 extend the full length of the body and are open at their forward ends. Suitable openings 27 are provided in the front plates 17, respectively, so as to permit the forward ends of the wedge elements 22 to move to a position forwardly of the forward face of the body 1.

In order to retain the wedges and blocks in position against radial displacement, suitable cover plates 30 are provided and arranged one to each slot 3. The cover plates 30 are connected to the body 1 at its periphery and each overlies the outer ends of its associated slot 3 and notch 4. Each cover plate 30 has a sliding guide surface 31 which faces inwardly of the body and which engages a cooperating outer guide surface 32 on the radially outermost side of each wedge element 20, thus guiding the associated wedge element for accurate movement endwise while retaining it in proper radial position.

Instead of surrounding ring carrying the wedges and which could cause binding stresses on the head, a means which does not confine the head radially is provided for moving the wedges. In the form illustrated, this means comprises a sleeve 40 having a radial flange 41 arranged adacent the rear face of the head 1. The flange 41 is connected by means of suitable lugs 42 and bolts 43 to the wedge elements 20, respectively, so that upon reciprocation of the sleeve 40 parallel to the axis of the head 1, the wedge elements 20 are caused to move concurrently therewith and thus concurrently advance and retract the wedge blocks 10. Clearance is provided between the radially outermost surfaces 44 and 45 of each lug 42 and its wedge element 20 so as to permit radial creeping thereby to relieve binding and permit expansion and contraction. Very close operating clearance is maintained between the lug and wedge endwise of the head. The lugs are in fixed position relative to the wedge elements in a direction endwise of the body, but have limited floating movement radially thereof.

In order to prevent any binding of the wedge operating means on the head, the wedge operating sleeve 40 is slidably mounted within a sleeve 44 which forms the spindle of the machine and which, in turn, is rotatably mounted in suitable bearings 45 at the forward end. The arrangement of this spindle is fully described in my United States Letters Patent No. 2,996,736, issued August 22, 1961, and entitled Automatic Tapered Thread Forming and Chamfer Cutting Machine.

Within the spindle of the machine is a pipe 47 on which is rotatably mounted a chamferring device 48 which forms no part of the present invention. This device is rotatable with the head about the pipe 47 and, as more fully described in United States Patent No. 2,996,736, is arranged to cooperate with a wedge surface on the head so as to be advanced and receded thereby.

Oil or coolant under pressure is supplied from any suitable source through the pipe 47 and flows therethrough and out of ports 48. The oil next passes through a port 49 into an annular reservoir 50 and therefrom through ducts 51 in the spindle. The ducts 51 in the spindle connect with ducts 52 in the head. The ducts 52 have their discharge ends 53 in position to dispose the lubricant or coolant on the workpiece at the location where cutting occurs.

The spindle is driven in a conventional manner and for advancing and receding the chasers the sleeve 40 is moved axially in opposite directions relative to the head 1 by a sine bar mechanism described in my co-pending application.

The head 1 is securely fastened to the forward end of the spindle in any well-known conventional manner so as to maintain it in fixed position relative thereto.

It is apparent that during the threading operation, the oil itself, since it is recirculated, distributes heat through the head 1 so that the head tends to expand. However, since the head is not constrained from radial expansion there are no binding stresses. Expansion of the head does not in any way affect the operation of the sleeve 40 and flange 42 and hence does not affect the operation of the wedge elements 20. Again, since the wedge elements are carried by the head itself and confined only by the plates 30 which can move radially outwardly with the body upon expansion, the wedge elements do not shift in position relative to the body 1 during its expansion and contraction.

The chaser blocks 10 may be made of the same material as the body or material having like coefficients of friction. Consequently, although the expansion of the body 1 tends to move the wedge element 20 outwardly of the axis of the body 1, the like expansion of the blocks 10 tends to move their inner ends, and hence the chasers, inwardly toward the body axis. Thus the expansion of the parts in opposite directions tends to compensate and offset, and to a large extent does compensate and offset, each other satisfactorily.

The parts can be assembled readily. By removing the front plates and loosening the bolts 43, the wedge elements and chaser blocks can be withdrawn forwardly, of the head and then serviced and returned to their positions. By removing the front plates 17 and the cover plates 30, the parts can be removed radially of the head 1.

As a result of the elimination of the wedge ring of the prior art, the severe binding stresses and the change of setting caused by unequal expansion and contraction of the ring and body are eliminated.

Furthermore, by the use of the individual cover plates 30 and individual front plates 17 all of the slots and notches are accessible for machining radially as well as from the front. Hence the head can be manufactured more accurately and economically, and with conventional tools.

Having thus described my invention, I claim:

1. A die head for a rotary spindle tapered thread cutting machine and comprising a solid body having a forward face, a rear face, and a central axial passage open at the forward face, and having a plurality of radial slots opening into the passage at their inner ends and extending from the passage outwardly to the outer periphery of the body, said slots being open at their outer ends, means supporting the body for rotation about the axis of said central passage, chaser blocks receivable endwise through the open outer ends of the slots, respectively, and reciprocable in the slots for advancing and receding chasers relative to the axis of said passage, said body having notches extending endwise of the body alongside the slots, respectively, each notch communicating with its associated slot at the side adjacent to its slot, and each notch being open outwardly at its radially outermost side at the periphery of the body, block operating wedge elements receivable through the outermost sides of the notches, respectively, and reciprocable endwise of the notches and body, respectively, said blocks and wedge elements having complementary coacting wedge surfaces operative when the wedge elements are moved endwise in one direction to advance the blocks toward the passage axis, wedge operating means supported rearwardly of the body and rotatable therewith and connected to the wedge elements for moving the wedge elements endwise, concurrently, in opposite directions, selectively, during rotation of the body while cutting a thread so that the thread is tapered and top plates respective to the slots and unconnected to each other and spaced from each other peripherally of the head and connected to the head at its periphery and in closing relation to the outer ends of the slots and their associated notches, each wedge element having an outwardly facing bearing surface, each of said plates having an inwardly facing bearing surface-engaged by the bearing surface of its associated wedge element and securing its associated wedge element in, and for sliding movement endwise of, its respective groove.

2. A die head according to claim 1 wherein said wedge operating means is connected to the wedge elements in fixed position relative thereto in a direction endwise of the body and for limited floating movement relative thereto radially of the body.

References Cited in the file of this patent

UNITED STATES PATENTS

| | | |
|---|---|---|
| 944,584 | Treadwell | Dec. 28, 1909 |
| 949,278 | Katzenmeyer | Feb. 15, 1910 |
| 1,464,779 | Shearman | Aug. 14, 1923 |
| 2,079,853 | Greenwood | May 11, 1937 |